United States Patent [19]
Ueda et al.

[11] Patent Number: 5,481,530
[45] Date of Patent: Jan. 2, 1996

[54] HIGH DENSITY OPTICAL RECORDING METHOD AND RECORDING MEDIUM

[75] Inventors: Chiga Ueda, Tokyo; Hidemi Yoshida, Atsugi; Masaaki Mizuno, Yokohama, all of Japan

[73] Assignee: Mitsubishi Chemical Corporation, Japan

[21] Appl. No.: 136,677

[22] Filed: Oct. 18, 1993

[30] Foreign Application Priority Data

Oct. 20, 1992 [JP] Japan .................................. 4-281967

[51] Int. Cl.$^6$ .................................................. G11B 7/24
[52] U.S. Cl. ........................................ 369/275.1; 369/112
[58] Field of Search ........................... 369/275.1, 275.2, 369/275.3, 275.4, 48, 54, 44.26, 112

[56] References Cited

U.S. PATENT DOCUMENTS

| | | | |
|---|---|---|---|
| 4,841,508 | 6/1989 | Kimura | 369/112 |
| 5,281,797 | 1/1994 | Tatsuno et al. | 369/118 |
| 5,353,277 | 10/1994 | Yasuda et al. | 369/275.4 |

FOREIGN PATENT DOCUMENTS 591932  5/1978  U.S.S.R. .

OTHER PUBLICATIONS

J. Magn Soc. Jpn., vol. 15, Suppelment No. S1 (1991), pp. 365–368 Sumi et al "High Density Recording on . . . Blue Laser".

J. Magn. Soc. Jpn., vol. 15, Supplement No. S1 (1991) pp. 49–52 Takahashi et al "Double Layered Film for Shorter Wavelength Laser Recording".

Ullmann's Encyclopedia of Industrial Chemistry, vol. A14; Immobilized Biocatalysts to Isoprene, pp. 196–239, 1989.

Philips Technical Review, vol. 42, No. 2, Aug. 1985, "Erasable Magneto–Optical Recording" by Hartmann et al, pp. 37–47.

Philips Technical Review, vol. 44, May 1989, No. 8–10; "Phase–Change Optical Recording" by Gravesteijn et al, pp. 250–258.

Patent Abstracts of Japan, Sep. 1991, vol. 15, No. 364; JP 3–142730 with abstract.

Primary Examiner—Nabil Z. Hindi
Attorney, Agent, or Firm—Nixon & Vanderhye

[57] ABSTRACT

Disclosed herein are an optical recording method of conducting recording/reading out for information by irradiating a laser beam at a wavelength of not more than 500 nm onto a recording layer of an optical disc having a track pitch of not less than 0.4 μm and less than 0.9 μm, the laser beam being incident from a disc substrate side of the optical disc using an objective lens having numerical aperture of 0.55 to 0.70, a recording area for information recording on the disc substrate being a flat area not having a guide groove for each track, and the disc substrate having a in-plane birefringence of not more than $20 \times 10^{-6}$ and a vertical birefringence of not more than $300 \times 10^{-6}$, and an optical recording medium suitable for use in the optical recording method.

15 Claims, 3 Drawing Sheets

HIGH DENSITY OPTICAL RECORDING METHOD AND RECORDING MEDIUM

BACKGROUND OF THE INVENTION

The present invention relates to an optical recording method and an optical recording medium.

Along with remarkable increase of the quantity of information in recent years, an information recording with high density and large capacity has been more and more required. An optical disc has advantageous features of high recording density, large capacity and excellent random accessibility. Further, since recording/reading out is conducted in a contactless state with an optical head, the recording medium less suffers from damages and is highly resistant to dusts or scratches to a disc surface and excellent in long-term reliability. The optical disc having such features can provide recording media just capable of satisfying social demands, and it is expected that the demand therefore will be further increased.

At present, various recording systems have been proposed for the optical disc. In the field of external memory devices for computers, a system referred to as a land recording type is predominant, in which guide grooves for tracking are disposed and information is recorded in flat areas (land) between the grooves.

For information recording/reading out, a semiconductor laser beam focused into a minute size by an objective lens is used usually. The minimum spot diameter (dmin) of the focused laser beam is represented by the following equation:

$$\text{dmin} = k \cdot \lambda / \text{NA} \quad (1)$$

wherein $\lambda$ is a wavelength of a laser beam used, NA is a numerical aperture of an objective lens, and k is a constant determined by the aperture shape of the lens and intensity distribution of incident optical rays.

Semiconductor lasers put to practical use at present for optical disc systems include two types having wave length regions of 825 nm and 780 nm. Further, objective lenses usually have a numerical aperture of not more than 0.55.

The recording density of an optical disc is restricted significantly by the laser beam diameter drain. The minimum mark length capable of recording/reading out is substantially determined depending on dmin excepting for a case of using special technique such as super-resolution. Accordingly, it is possible to increase both the linear recording density and the radial recording density by decreasing dmin.

For decreasing dmin, it is at first considered to use a lens of a large numerical aperture. However, as NA is increased, the focal depth becomes smaller as shown in the equation (2) and an allowance for the inclination of the disc is reduced abruptly and, accordingly, this means it is difficult for a high NA lens to be adopted for a practical system.

$$\text{Focal depth} = \lambda / (\text{NA})^2 \quad (2)$$

Further, in a disc of a substrate incident type, since there is a risk that an objective lens is brought into contact with a disc as NA is increased, the upper limit of NA is about 0.70 for a substrate of 1.2 mm thickness used at present.

In view of the above, it is effective for attaining high density recording to use a laser of shorter wavelength as a light source. If the wavelength of the laser beam is not more than 500 nm, it is theoretically possible to increase the recording capacity to more than ten times of existent optical discs, by combination with a mark length recording system (FWM system) or MCAV (Modified Constant Angular Velocity) system.

However, in a case of using a short wavelength laser, although the linear recording density and the radial recording density of the optical disc could theoretically be increased each to an equal high density, the recording density in the radial direction is not so high as that in the linear direction.

In both of the land recording system and the groove recording system, an amount of light incident to a signal detector decreases by so much as a laser beam is diffracted and scattered by lands or grooves, and a signal intensity decreases. If a track pitch is narrowed for increasing the radial density, the amount of diffracted and scattered is naturally increased to result in remarkable reduction in the amount of reflected light.

For instance, in the land recording system, although the guide groove itself can be narrowed to some extent, there is also a limit for narrowing the groove while keeping a depth capable of obtaining a sufficient tracking signal as it is. Further, if the groove, is deep and narrow, since the gradient inclination of a slope is abrupt, it is difficult to achieve homogeneous covering of a recording layer.

Further, since an edge portion between the groove and the land is not smooth but microscopically uneven, this causes noises. Then, the effect on the signal tends to increase not gradually but rather abruptly at a portion in which a track pitch is narrowed to some extent. This is a limit in narrowing the track pitch and it is solely determined depending on the laser wavelength providing that NA is constant.

For instance, at NA of 0.55, since the limit for the track pitch at a wavelength of 780 nm is about 1.35 μm in view of a practical level, a lower limit for the track pitch at a wavelength of 500 nm is 1.35 (μm)×500 (nm)/780 (nm)= 0.87 (μm), that is, about 0.9 μm in a case where guide grooves are present.

Further, when a short wavelength laser beam is used, there are the following problems inherent to a short wavelength region.

This is, at first, lowering of the photosensitivity in a light detector. In a light detection device and photodiode used at present for an optical disc drive, light is detected by measuring electric current caused when light excites electrons in the vicinity of pn junction into a conduction band and electrons in the band move through the pn junction. Since light absorption coefficient of a Si semiconductor constituting a photodiode increases toward the short wavelength, light at short wavelength is absorbed near the surface of the photodiode and less reaches to the vicinity of the pn junction. As a result, since the numerical electrons excited in the vicinity of the pn junction decreases, the photosensitivity is lowered. For instance, the sensitivity at 500 nm lowers to about ½ as compared with that at a wavelength of 780 nm. Namely, the signal intensity is reduced to about one-half at 500 nm even for a signal of an identical reflectivity.

On the other hand, as compared with the reduction of the signal intensity, noises are less reduced. Noises in the optical disc system include noises generated from a medium, as well as noises contained in the oscillated laser beam itself and system noises generated in the detection system.

Among them, since the system noise is constant irrespective of the signal intensity, the entire noise intensity is increased as compared with the signal intensity to lower C/N. Accordingly, to increase the sensitivity in the short wavelength is a subject for the detector and to increase the signal intensity and decrease noise is a subject for the optical disc.

Further, there is a problem of birefringence in the substrate. The birefringence in the substrate causes reduction of the signal intensity and increase of the noises. Particularly, in a magneto-optical disc, since recording signals are read out by detecting the rotation of the plane of polarization, the birefringence of the substrate gives a direct effect on the characteristics of the readout signals. For instance, it brings about reduction of the signal intensity and increase of the noises. Further, since the birefringence causes aberration, the laser beam can not be focused on the recording layer to the diffraction limit shown by the equation (1) and this also causes reduction of the signal intensity or gives an effect, for example, on jitter and crosstalk. Furthermore, the effect of the birefringence becomes more remarkable as the laser wavelength becomes shorter.

The present inventors have found that by recording information on a flag area not having a guide groove, the problem discussed above can be overcome, and have accomplished the present invention based on the finding.

SUMMARY OF THE INVENTION

In a first aspect of the present invention, there is provided an optical recording method of conducting recording/reading out for information by irradiating a laser beam at a wavelength of not more than 500 nm onto a recording layer of an optical disc comprising a disc substrate and a recording layer, and having a track pitch of not less than 0.4 μm and less than 0.9 μm, a recording area for information recording on the disc substrate being a flat area not having a guide groove for each track, and the disc substrate having a in-plane birefringence of not more than $20 \times 10^{-6}$ and a vertical birefringence of not more than $300 \times 10^{-6}$, the laser beam being incident from a disc substrate side of the optical disc using an objective lens having numerical aperture of 0.55 to 0.70.

In a second aspect of the present invention, there is provided an optical recording medium suitable for use in the optical recording method as defined in the first aspect, comprising a disc substrate and a recording layer, and having a track pinch of not less than 0.4 μm and less than 0.9 μm, a recording area for information recording on the disc substrate being a flat area not having a guide groove for each track, and the disc substrate having a in-plane birefringence of not more than $20 \times 10^{-6}$ and a vertical birefringence of not more than $300 \times 10^{-6}$.

DETAILED DESCRIPTION OF THE INVENTION

Figure 1:
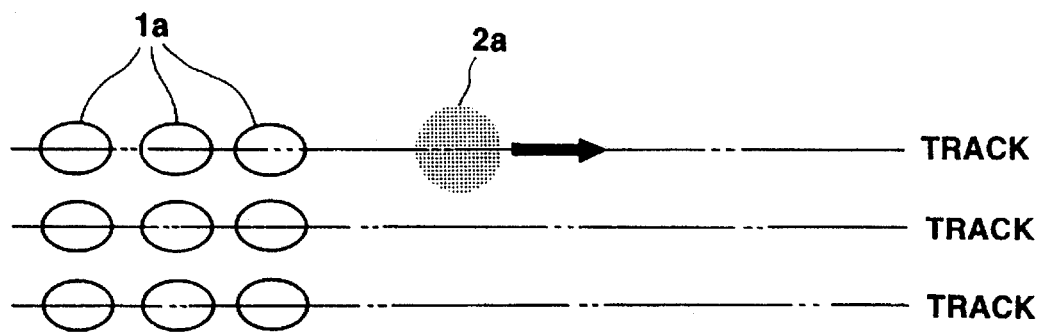
FIG. 1 shows an example of a pit arrangement for tracking servo.

According to the present invention, reduction of reflectivity can be suppressed and increase of noises can be prevented by conducting recording/reading out to an optical recording medium having attack pitch of not less than 0.4 μm and less than 0.9 μm in which a recording area for information is a flat area not having a guide groove for each track, by a laser beam at a wavelength of not more than 500 nm and using an objective lens having NA of 0.55 to 0.70, thereby preventing scattering of laser beam.

It is essential that the wavelength of the laser beam used for recording/reading out is not more than 500 nm for attaining the high recording density. Further, a wavelength of not less than 300 nm is preferred considering UV absorption of a disc substrate. As the laser beam, there can be used laser beams at 400 to 500 nm outputted from gas lasers, for example, of Ar, Kr and He-Cd, laser beams at 400 to 500 nm outputted from II–VI group semiconductors such as ZnCdSe, ZnSe, ZnCdS and ZnSeS, laser beams at 340 to 390 nm obtained from the output light of III–V group semiconductor lasers and passing the same through SHG (Second Harmonic Wave Generation) device and a laser beam at 350 nm obtained from the output light of YAG laser by semiconductor laser excitation and passing the same through a THG (Third Harmonic Wave Generation) device.

In view of the size reduction of the optical disc system, laser beam from the semiconductor laser is preferred.

The numerical aperture of the objective lens used for focused irradiation of the laser beams is within a range from 0.55 to 0.70. If NA is not more than 0.55, since the laser beam can not be focused into a small diameter, no high density recording can be conducted. On the other hand, if NA is greater than 0.70, the focal depth is reduced to make optical disc servo difficult. For instance, the focal depth at a laser wavelength of 300 nm is about 0.6 μm, and optical disc servo is extremely difficult for the optical system of focal depth of 0.6 μm in the existent servo technique. In addition, it is extremely difficult at present to manufacture an optical disc suitable to such disc servo.

In order to improve the reliability of the optical disc, the recording/reading out laser beam enters from the disc substrate. This is because the laser beam less suffers from the effect of dust or stain on the substrate. When a laser beam is focused through a substrate of about 1 mm in thickness, since the spot diameter at the incident surface of the substrate is about 1 mm, the laser beam scarcely suffers from the effect of dusts of about several tens micrometers deposited.

The track pitch of the recording/reading out track is not less than 0.4 μm and less than 0.9 μm. If the track pitch is not less than 0.9 μm, no high density recording can be attained, whereas if it is less than 0.4 μm, the effect of crosstalk is increased.

The optical disc according to the present invention using a light source of a short wavelength of not more than 500 nm and an objective lens of a large numerical aperture, a substrate of lower birefringence and higher mechanical accuracy as compared with the prior art is preferably used for.

Use of the low birefringence substrate is necessary, because as the laser wavelength is shorter, the birefringence of the substrate gives a more remarkable effect in inverse proportion with the wavelength. The disc substrate has a in-plane birefringence of not more than $2 \times 10^{-6}$, preferably not more than $10 \times 10^{-6}$, and a vertical birefringence of not more than $300 \times 10^{-6}$, preferably not more than $200 \times 10^{-6}$. By using a disc substrate having such birefringences, it is possible to suppress reduction of the signal intensity and increase of the noises, thereby attaining higher recording density for the optical disc.

The disc substrate having such birefringences is available for one skilled in the art.

Further, a substrate of high mechanical accuracy such as low axial deflection (acceleration) and low tilt is preferred by the reasons described below. In the optical disc according to the present invention, because the focal depth (in proportion with wavelength and inverse proportion with squares of the numerical aperture) is extremely small, focus servo can not follow the disc with large axial deflection (acceleration). Further, if a lens of a high numerical aperture is used, this remarkably increases the comatic aberration (in proportion with cube of the numerical aperture) and astigmatism (in proportion with square of the numerical aperture) relative to tilt, to result in deterioration of recording signal characteristics.

For such optical disc substrate, glass, glass/2P (glass having a photocured resin layer thereon) and plastic can be used. Although, glass, glass/2P substrate may be considered optimal for the substrate of low birefringence and high mechanical accuracy, since it is liable to crack and requires complicate steps for obtaining a preformat substrate to increase cost, a plastic substrate is preferred as the optical disc substrate. For the material of the plastic substrate, a polycarbonate resin is generally used. In the case of using this material, birefringence tends to increase but a substrate usable in the present invention can be manufactured by optimizing conditions for injection molding or the like.

Further, since a substrate of low birefringence can be obtained easily by the use of polymethyl methacrylate resin or polyolefin resin by injection molding, a substrate usable in the present invention can be manufactured relatively easily.

The thickness of the substrate used for the optical disc according to the present invention is preferably within a range from 0.3 to 1.2 mm. Further, a thickness within a range of 0.4 to 0.8 mm is further preferred because of the following reason. In the present invention, since a light source of a short wavelength and an objective lens of a high numerical aperture are used, a value of tilt allowable to a substrate becomes more severe as compared with existent value (for example, 4 mrad). On the other hand, since the aberration of the focused beam caused by tilt is in proportion with the thickness of the substrate, aberration due to the tilt can be reduced by decreasing the thickness of the substrate. As a result, it is possible to moderate the allowable value for the tilt. For instance, the allowable value for tilt can be moderated from 0.2 mrad to 0.3 mrad, in The case of using an object lens with numerical aperture of 0.60 and a laser beam of 500 nm wavelength, by decreasing the substrate thickness from 1.2 mm to 0.8 mm. As the thickness of the substrate is decreased, the effect of birefringence can be reduced and the allowable value for the tilt is also moderated. However, if the thickness is decreased excessively, shearing strain occurred in injection molding may be increased to increase the birefringence itself. Further, if it is excessively thin, replication preciseness of track servo pits or address pits during injection molding may be reduced. If they are taken into consideration, the lower limit for the actually possible thickness of the substrate may be 0.4 mm. The substrate can be used as a single plate disc in the form of final product, but, in the case of the substrate of 0.8 mm or less in thickness, use as a double plates disc laminated each other is preferred since the mechanical characteristics are stabilized in a wide range of temperature and humidity environment.

In the present invention, information is recorded in a flat area not having a guide groove for each track. The terms "not having a guide groove for each track" used herein means that no guide groove is present or that at least two tracks, preferably at least three tracks are present between neighboring guide grooves.

Also in this case, focusing servo and tracking servo are necessary like that as in the conventional optical recording method.

For the focusing servo, existent method, for example, astigmatism method, knife edge method, foucault method, critical angle method or the like employed so far is used.

Further, the following methods are used for tracking servo, for example.

In the first method, tracking servo is conducted by sampling and detecting deviation of the focused beam from the position of tracking servo pits disposed in advance on a disc. Specifically, tracking servo is conducted by sampling and detecting the deviation amount of the laser beam from the pit center positions of pits disposed as (1) a group of pits arranged on the center of track or (2) a pair of pits deviated from the center of the tracks in the opposite direct ions from each other, at certain intervals on a disc.

Figure 2:
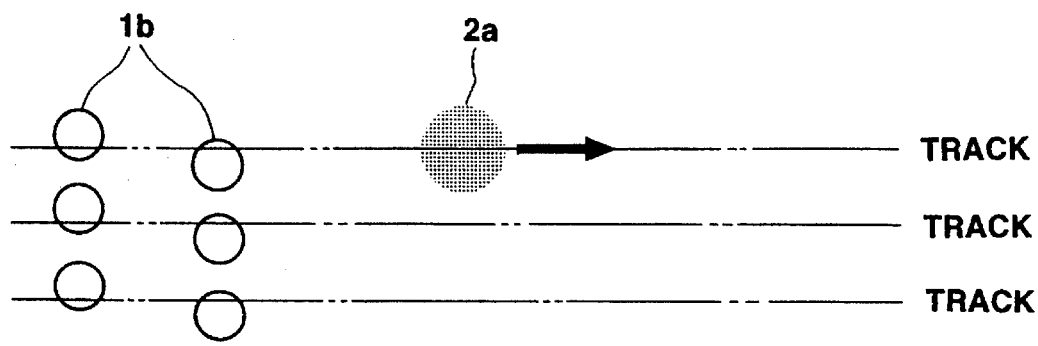
FIG. 2 shows another example of a pit arrangement for tracking servo.

FIG. 1 shows an example of the method (1). This example is one-beam system of attaining a tracking error signal by sampling a push-pull signal in which a beam $2a$ is obtained from pits $1a$. Further, a tracking error signal can be detected also by using three-beam rows having a slight angle relative to the track. FIG. 2 shows an example of the method (2). In this case, tracking servo is conducted by controlling such that the signal intensities from pits $1b$ disposed from each other to opposite sides relative to the center of the track are equal.

Figure 3:
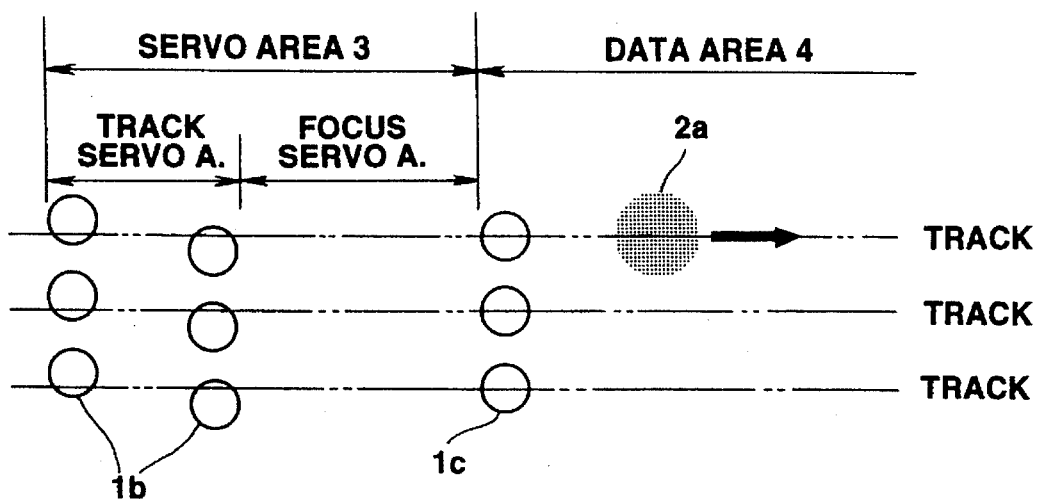
FIG. 3 shows an example of a pit arrangement for a combination of tracking servo and focusing servo.

An example of the sampled servo system is shown in FIG. 3. The system is also an application example of the method (2), which is a discontinuous servo system of disposing about 1000 to 1500 of servo areas per one revolution of a track, prefermatting wobble marks, namely, pits $1b$ disposed from each other on opposites sides relative to the track center and obtaining all the servo signals from the servo areas 3. In FIG. 3, a tracking error signal is detected from wobble pins $1b$, and a focus error signal is detected at a mirror face between the downstream wobble pit and a clock pit $1c$. Further, data clock for recording/reading out is generated from a distance between a downstream wobble pit position and a clock pit position. The system has the following features as compared with the continuous servo system in which continuous grooves are employed generally:

(1) Since the data area 4 and the servo area 3 are completely separated in view of time and space, there no interference between the data signal and the servo signal, so that servo characteristics are stable.

(2) Since no offset component is generated in the tracking error detection system, tolerance of the optical system can be moderated significantly and disc compatibility can be attained easily.

In the present invention, since a light source at short wavelength and an objective lens of high NA are used, although the allowance to tilt of the disc becomes rather severe, the allowance to tilt can be moderated considerably by using the sampled servo system. Therefore, the sampled servo system is optimal as the focusing and tracking servo system used in the optical recording system in the present invention.

In this method, track and sector address signal information is generated from prepits or recorded pits formed on a track at an interval corresponding to the sector size.

Figure 4:
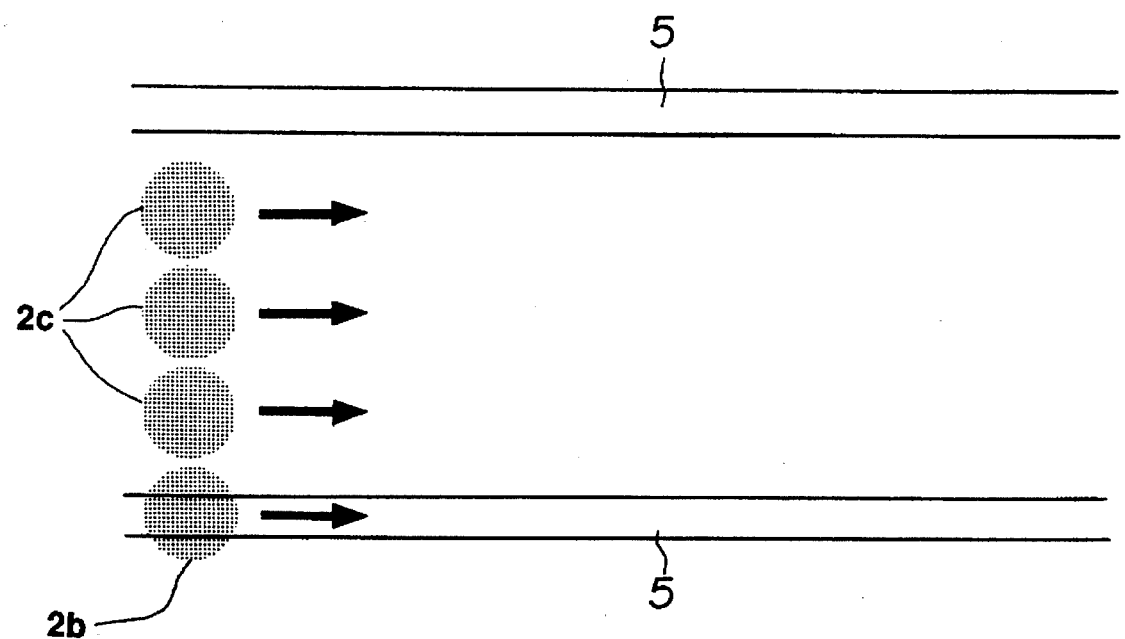
FIG. 4 shows an example of a groove arrangement for tracking servo.
Figure 5:
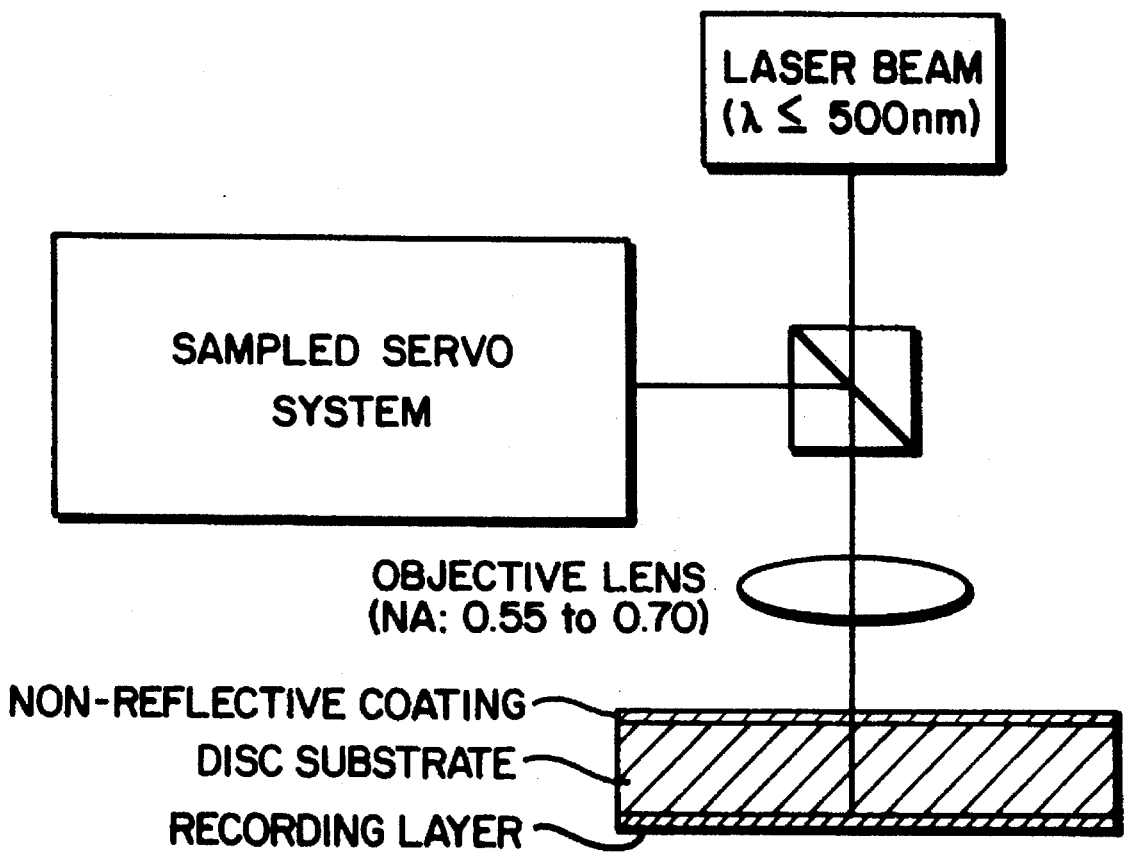
FIG. 5 shows a diagrammatic view of a preferred system for the recording/reading out method according to the present invention.

The second method conducts servo by using a continuous servo means and records information on a flat area with no grooves, i.e., in plural tracks between neighboring guide grooves. In this case, one laser beam $2b$ for servo and at least two laser beams $2c$ for data recording/reading out are necessary. FIG. 4 shows an example of servo by using four beams in which one-beam 2b is used for servo and remaining three-beams 2c are used for recording/reading out.

In this example, a continuous groove 5 for track servo is used but a pit row may also be used. Also in this method, track and sector address signal information is generated from prepits or recorded pits formed on a track at an interval corresponding to the sector size.

As the third method, there is a method of tracking servo by conducting recording only with servo signals and data on a disc having no prepits or guide grooves at all only by tracking servo and detecting the recorded signals upon reading out. This method can provide a merit of simplifying the disc structure but this requires such a precious disc driving and head-positioning system as not causing overlap of tracks upon recording.

In a case of using a laser at a wavelength of not more than 500 nm, as mentioned above, since the sensitivity of a silicon photodiode generally used at present as a signal defector reduces to ½ to ⅓ of that in the existent laser wavelength region (780 run), no preferred signal characteristics are obtained, particularly, in a magneto-optical disc. The recording material used at present for the magneto-optical disc (heavy rare earth and transition metal amorphous alloys such as TbFeCo) has a smaller Kerr rotation angle, which is proportional to the signal intensity, at a shorter wavelength. This also deteriorates the signal characteristics. For instance, in TbFeCo, the Kerr rotation angle decreases to 0.3 degree at a wavelength of 800 nm and 0.2 at a wavelength of 450 nm, that is, to about ⅔. Therefore, earnest study for recording materials having large Kerr rotation angle in a short wavelength region has been conducted.

A Pt-Co multi-layered film is one of the candidates. However, although the Kerr rotation angle is as large as 0.4 degree at a wavelength of 450 nm, there are several problems to be solved for a practical use, such as a small coercive force and a large noise due to a crystalline film.

For compensating such reduction in the sensitivity of the light signal detector and reduction of the Kerr rotation angle, it is preferred to keep the reflection of the laser beam low at the surface of the substrate or reduce the reflection substantially to 0.

Since the recording/reading out laser beam is entered from the side of the substrate passing therethrough to the recording layer, not only a reflected light from the recording layer but also a reflected light from the surface of the substrate having no concern with the signal also return to the light signal detector. Since the reflected light from the surface of the substrate acts in the direction of reducing the effective Kerr rotation angle, it is particularly effective to decrease the reflected light from the surface of the substrate in a case as in the present invention in which the Kerr rotation angle is small and the sensitivity of the light signal detector is low. In a magnet-optical disk put to practical use at present, the reflectivity from a recording layer comprising a multilayered structure is from 15 to 20%, and the reflectivity from the surface of the substrate is as large as about 5%. In particular, as the wavelength of a light source becomes shorter, since the refractive index of the sutstrate increases, the reflectivity from the surface of the substrate may increase as large as 6 to 7%.

Therefore, the method of suppressing the reflected light from the surface of the substrate is particularly useful in the case where the wavelength of the light source is made shorter.

Coating of a single layered thin film or a multi-layered thin film on the substrate is generally the most practical method of keeping the reflected light from the surface of the substrate low.

In a single-layered coating, reflectivity from the substrate can be lowered to about 0.5% by applying coating to a thickness of about $\lambda/4n$ (wherein, $\lambda$ is a wavelength of a light source and n is a refractive index of coating layer) of magnesium fluoride (n=1.38) or cryolite $Na_3AlF_6$ (n=1.34), which is a material having a refractive index smaller than that of a substrate material (n=about 1.60). Such materials can be applied by vacuum vapor deposition, sputtering or ion plating method.

Further, the reflected light from the surface of the substrate can be reduced substantially to 0 by coating a multi-layered film of different refractive indices. For example, In a two-layered film, the reflectivity of the substrate can be reduced to not more than 0.02% by coating a material having a refractive index of 1.70 to a thickness of $\lambda/4n$ on a substrate and, further, coating a material having a refractive index of 1.38 further thereover to a layer thickness of $\lambda/4n$. Further, a anti-reflection layer can be formed also with three-, four- or five-layered film. Such anti-reflection means with the multi-layered film is actually applied to a spectacle lens or camera lens.

However, it is preferable in view of the productivity that the number of the layer for the anti-reflection layer is fewer.

The recording layer is composed of materials causing optical change by the irradiation of a laser beam. Generally, a magneto-optical type, a phase change type and an ablative type recording materials have been known. In a magneto-optical recording system, a perpendicular magnetized layer is adopted as a recording layer, which is heated to a temperature higher than a curie point by the irradiation of a laser beam and is recorded magnetically by applying a magnetic field simultaneously. As the magnetic field, an external magnetic field is generally used but a method of saving the external magnetic field by forming another magnetic layer in a medium is also known. Reading out is conducted by utilizing 5 magnetic Kerr effect. Linearly polarized light is irradiated to the recording layer and the direction of the magnetization is read out by the direction of the rotation of the plane of polarization of the reflected light. The quality of the readout signal is generally indicated by the figure of merit (FOM):

$$FOM = \sqrt{R} \times \theta_k$$

wherein R is the reflectivity and $\theta_k$ is the magnetic Kerr rotation angle.

As a magneto-optical recording layer material commercialized at present, heavy rare earth-transition metal amorphous alloys typically represented by TbFeCo are generally known. However, the Kerr rotation angle of such alloys decreases as the wavelength of the light becomes shorter and it reduces as far as by about 30% at a wavelength of not more than 500 run as compared with the case at a wavelength of 800 nm. Accordingly, the quality of the readout signal of the magneto-optical medium is remarkably deteriorated, in a short wavelength region, being coupled with the lowering of the sensitivity of the photodiode in the drive described previously.

As the wavelength of the laser beam is shorter, the focused beam spot diameter decreases and an energy density per unit area increases. Therefore, the temperature of the recording layer tends to be higher by irradiation of the reproducing light. The Kerr rotation angle decreases as the temperature of the recording layer rises, and this tendency becomes remarkable as the Curie point is lower. Accordingly, the Kerr rotation angle at a high temperature can be enhances by raising the Curie point or the recording layer. For this purpose, it is effective to increase a Co concentration.

In a TbFeCo alloy recording layer, a reproduced signal of good quality can be obtained also in a short wavelength region of not more than 500 nm by increasing the Co concentration in a 3d transition metal to greater than 15 at %, and increasing the Co concentration in a 3d transition metal to greater than 35 at % in a NdTbFeCo alloy.

Further, while Al alloys have been used so far as the material for the reflective layer, the Kerr rotation angle in a short wavelength region can be increased further by using Ag and alloys thereof.

It is preferred in a short wavelength region of not more than 500 nm, a constitution of a dielectric layer, a recording layer of the materials described above and a reflective layer, which are disposed in this order on a substrate. In this case, the preferable thickness of each layer is 20 to 55 nm, 10 to 30 nm and 30 to 100 nm, respectively.

In the phase change recording method, recording is conducted by using two or more kinds of different states. Two phases, i.e., a crystalline state and an amorphous state are generally used. And also two different crystalline states or quasi-crystalline state can be used. Description will now be made to a case, for example, of forming recording pits of an amorphous state in a cryotalline state.

Recording, that is, making of an amorphous state is achieved by heating the recording layer to a temperature higher than the melting point by irradiation of a laser beam and then quenching the layer. Erasing, that is, crystallization is attained by heating the recording layer to a temperature around a melting point higher than the crystallization temperature by a laser beam, or gradually cooling from a temperature higher than the melting point. Reading out is conducted by detecting the difference in the amount of light utilizing difference of the reflectivity or phase difference of the reelected light between crystalline and amorphous states.

As the recording layer material for the phase change recording method, chalcogenic type alloy typically represented by GeSbTe is often used. As a matter of fact, the material and the composition of the recording layer is a major factor of determining characteristics such as crystallization temperature, stability during millions cycle overwriting and long-term reliability. For instance, a composition comprising a mixture of GeTe and $Sb_2Te_3$ incorporated with a small amount of Sb is generally used in which the crystallization temperature is lowered as the amount of Sb decreases.

Generally, a phase change medium comprises several layers such as dielectric layer, recording layer, dielectric layer, reflective layer and protective layer on a substrate.

The dielectric layer has an effect as a protection layer for preventing deformation of the recording layer caused by melting and volume change and thermal damages to the substrate during heating-cooling steps and for preventing degradation of the recording layer by humidity. Further, the dielectric layer above the recording layer also has an effect of controlling the cooling rate of the recording layer. The dielectric layer of a large thickness is generally referred to as a gradual cooling structure in which cooling rate for the recording layer is low and crystallization tends to occur. On the other hand, a layer of a relatively thin thickness is referred to as a quenched structure in which the cooling rate for the recording layer is high and it tends to form an amorphous state.

Furthermore, the dielectric layer, the layer thickness of which is properly set to the laser wavelength, is also used for enhancing the contrast of the reflected light due to an interference effect.

As the wavelength of the laser beam becomes shorter and the beam diameter decreases, it will be more difficult to erase the recorded signals. Since the temperature distribution of an area irradiated by the beam becomes abrupt, the cooling rate increases and crystallization becomes difficult.

For making the crystallization easier, there are a method of lowering the crystallization temperature and a method of constituting a medium as a gradually cooling structure. The crystallization temperature can be lowered easily by changing the material and the composition of the recording layer. However, lowering of the crystallization temperature tends to recrystallization and erasure of amorphous bits in a room temperature, which leads to deterioration of long-term reliability. On the other hand, the gradually cooling structure also involves a problem of forming coarse crystals as described below. When an amorphous bit is formed, a coarse crystalline region is formed at the periphery. Since the periphery of the molten recording layer has a relatively small cooling rate, it recrystallizes. If the cooling rate is low as in the gradually cooling structure, coarse crystals tend to be formed, to enlarge the coarse crystal area at the periphery of the bit. Since the coarse crystals have reflectivity somewhat different from that of fine crystals crystallized from a temperature lower than the melting point, this deteriorates the quality of readout signals. Furthermore, since the area ratio of the coarse crystals in a beam area becomes relatively larger as the diameter of the readout beam is smaller, the effect becomes more significant as the wavelength is shorter.

For improving the erasability while minimizing the effect on the coarse crystals and the long-term reliability, it is preferred to change both of the layer constitution and the composition of the recording layer.

As a result of a study, it has been found for example, for a medium in which a $(ZnS)_{80}(SiO_2)_{20}$ dielectric layer, a GeSbTe recording layer, a $(ZnS)_{80}(SiO_2)_{20}$ dielectric layer and an Al alloy reflective layer are disposed in this order on a substrate, that a preferred layer constitution comprises layer thickness of about 160 nm, 20 nm, 20 nm and 200 nm, respectively. In this case, a good recording/erasing performance can be obtained in a wide range of linear velocity, about 1 to 25 m/s, by adjusting the amount of Sb to a range from 35 to 31 at % in the recording layer.

Further, it is also preferred for such a constitution as having layer thickness of about 160 nm, 80 nm, 100 nm and 200 nm respectively and containing about 22 at % of Sb in the recording layer.

However, various optimal points are present in the phase change medium described above depending on the combination of material, composition and thickness for each of the layers, and the compositions described above are shown only as some examples.

Various combinations are possible for the materials of the dielectric layer and they are determined taking notice of refractive index, heat conductivity, chemical stability, mechanical strength, adhesion force with another layer or a substrate, or the like. Generally, there can be used such materials as having high transparency and high melting point, for example, oxides, sulfides and nitrides of Mg, Ca, Sr, Y, La, Ce, Ho, Er, Yb, Ti, Zr, Nf, V, Nb, Ta, Zn, Al, Si, Ge and Pb, as well as fluorides of Ca, Mg, Li or the like. They can be also used in admixture for controlling The refractive index or the like.

As the material for the reflective layer, Ag, Au, Pt, Al or a mixture thereof, as well as such material incorporated with a little amount of additives are suitable.

If the linear velocity increases excessively, the cooling rate for the recording layer increases failing to conduct enough crystallization, that is, erasure. On the other hand, if the linear velocity reduces excessively, no sufficient cooling rate to form amorphous bits can not be obtained.

By the way, the phase change type medium is also applicable to a write-once type medium by modifying the constitution in the direction of less causing crystallization. In this case, each of layer thickness in the above-mentioned constitution is preferably set, for example, to about 160 nm, 20 nm, 20 nm and 200 nm, and $Ge_{12}Sb_{37}Te_{51}$ is preferred as the composition for the recording layer.

Furthermore, it is possible to manufacture a disc inexpensively with no requirement for initialization by using a more crystallizing composition to form a write-once type medium for recording crystalline bits in an amorphous state. In this case, the thickness for each of the layers, for example, in the foregoing constitution is preferably about 160 nm, 20 nm, 140 nm and 100 nm, and $Ge_{12}Sb_{31}Te_{57}$ is preferred as the composition for the recording layer.

The linear velocity for conducting recording is preferably from 5 to 30 m/s for this write-once type medium. If the linear velocity exceeds the above-mentioned level, a great amount of laser power is necessary and no sufficient crystalline bits can be formed.

Further, if the linear velocity is reduced to less than the lower limit, the bit shape is distorted by thermal interference. However, it may be used at a lower linear velocity by modifying the recording system such as a pulse train method. Since the phase change write-once type medium accompanies no configurational change of the recording layer, rims are not formed at the periphery of the recording bits, and readout signals of good quality are obtained. Further, an air sandwich structure is not necessary.

In the ablative recording system, recording is conducted by melting and removing a recording layer to form pits under the irradiation of a laser beam. Since the recording layer is completely removed to expose a lower layer or a substrate at a pit place, the pit is detected as a change of amount of the reflected light. Since this method utilized an irreversible recording accompanying a physical change of ablation, it has a merit that the recording content has excellent long-term reliability.

As the material for the ablative type recording layer, metals such as Te or Bi are used and Te-Se series alloys containing Se for enhancing aging stability are often used. Since they have low melting points, laser power required for recording can be saved, which is advantageous in view of the recording sensitivity. The thickness of the recording layer is preferably about 280 nm for instance.

For forming the pit, it is necessary to strip the molten recording layer substance while overcoming the adhesion force with the substrate. Then, for moderately reducing the adhesion, it is known to dispose an underlying layer made up of, for example, fluorocarbon or nitrocellulose between the recording layer and the substrate. The thickness of the underlying layer is, for example, about 400 nm.

According to the optical recording method and medium of the present invention, recording density can be remarkably improved, e.g. by more than three times, while maintaining similar C/N, compared with an optical disc which is commercially available at present.

EXAMPLES

Description will now be made more specifically to the present invention by way of examples but the invention is not limited to them.

Example 1

Recording/reading out was conducted by rotating a magneto-optical disc having a dielectric layer of $Ta_2O_5$ (40 nm in thickness), a recording layer of TbFeCo (20 nm in thickness) and a reflective layer of AgTi (50 nm in thickness) formed successively by sputtering on a mirror face substrate of 1.2 mm in thickness made of polymethyl methacrylate (PMMA), at a linear velocity of 15 m/s, and focusing an argon laser beam of a wavelength of 488 nm through an objective lens having a numerical aperture of 0.60. When recording was conducted at a track pitch of 0.85 µm under the conditions of a frequency of 17.5 MHz and a pulse width of 20 ns, CNR of 47 dB was obtained and a bit error rate was satisfactory as $1\times10^{-5}$. In addition, the amplitude variation of the readout waveform was as small as not more than 10%. The used PMMA substrate had the in-plane birefringence of $10\times10^{-6}$ and the vertical birefringence of $100\times10^{-6}$.

Example 2

Recording/reading out was conducted by rotating a magneto-optical disc having a recording layer of the same layer constitution as that in Example 1 on a mirror face substrate of 1.2 mm in thickness made of glass, at a linear velocity of 15 m/s and by focusing an argon laser beam of a wavelength of 488 nm through an objective lens having a numerical aperture of 0.60. When recording was conducted at a track pitch of 0.85 µm under the conditions of a frequency of 17.5 MHz and a pulse width of 20 ns, CNR of 48 dB was obtained and a bit error rate was satisfactory as $1\times10^{-5}$. In addition, the amplitude variation of the readout waveform was as small as not more than 10%. The used glass substrate had the in-plane birefringence of $2\times10^{-6}$ and the vertical birefringence of $10\times10^{-6}$.

Example 3

When recording was conducted by rotating the same magneto-optical disc as in Example 1 at a linear velocity of 15 m/s, and focusing a krypton laser beam of a wavelength of 407 nm through an objective lens having a numerical aperture of 0.70, at a track pitch of 0.50 µm under the conditions of a frequency of 17.5 MHz and a pulse width of 20 ns, CNR of 47 dB was obtained and the bit error rate was satisfactory as $2\times10^{-5}$. Further, the amplitude variation of the readout waveform was as small as not more than 10%.

Example 4

When recording was conducted by rotating a magneto-optical disc in which magnesium fluoride was formed to a layer of 100 nm thickness by vacuum deposition to the laser-incident surface of a substrate of the disc in Example 1, at a linear velocity of 15 m/s and focusing an argon laser beam of a wavelength of 488 nm through an objective lens of a numerical aperture of 0.60, at a track pitch of 0.85 µm under the conditions at a frequency of 17.5 MHz and a pulse width of 20 ns, CNR of 48.5 dB was obtained and a bit error rate was satisfactory as $1\times10^{-5}$. The amplitude variation of the readout waveform was as small as not more than 10%.

Example 5

When recording was conducted by rotating a magneto-optical disc in which a recording layer of the same layer constitution as in Example 1 was formed on a mirror face polycarbonate substrate of 1.2 mm in thickness, at a linear velocity of 15 m/s, and at a track pitch of 0.85 μm by focusing an argon laser beam of a wavelength of 488 nm through an objective lens having a numerical aperture of 0.60 and under the conditions of a frequency of 17.5 MHz and a pulse width of 20 ns, CNR of 45 dB was obtained and the hit error rate was satisfactory as $3 \times 10^{-5}$. Further, the amplitude variation of the readout waveform was as small as not more than 10%. The used polycarbonate substrate had the in-plane birefringence of $15 \times 10^{-6}$ and the vertical birefringence of $250 \times 10^{-6}$.

Example 6

When servo tracking was conducted by rotating a magneto-optical disc in which a recording layer of the same layer constitution as in Example 1 was formed using a polycarbonate substrate of 1.2 mm in thickness in which prepits for sampled servo tracking were formed at a track pitch of 0.85 μm, at a linear velocity of 15 m/s and by focusing an argon laser beam of a wavelength of 488 nm through an objective lens having a numerical aperture of 0.60 and when recording was conducted under the conditions of a frequency of 17.5 MHz and a pulse width of 20 ns, CNR of 47 dB was obtained and the bit error rate was satisfactory as $1 \times 10^{-5}$. In this case, the amplitude variation of the readout waveform was as small as not more than 10%. The used glass substrate had the in-plane birefringence of $15 \times 10^{-6}$ and the vertical birefringence of $250 \times 10^{-6}$.

Example 7

A dielectric layer of $ZnS$-$SiO_2$ (160 run in thickness), a recording layer of GeSbTe (20 nm in thickness), a dielectric layer of $ZnS$-$SiO_2$ (20 nm in thickness) and a reflection layer of AlTa (200 nm in thickness) were formed successively by sputtering on a mirror face polycarbonate substrate of 1.2 mm in thickness having the in-plane birefringence of $15 \times 10^{-6}$ and the vertical birefringence of $250 \times 10^{-6}$, to obtain a phase change type optical disc. Recording/reading out was conducted by rotating the disc at a linear velocity of 15 m/s and focusing an argon laser beam of a wavelength of 488 nm through an objective lens having a numerical aperture of 0.60.

When recording was conducted for a track pitch of 0.85 μm under the conditions of a frequency of 17.5 MHz and a pulse width of 20 ns, CNR of 51 dB was obtained and the bit error rate was satisfactory as $1 \times 10^{-5}$. The amplitude variation of the readout waveform was as small as not more than 10%.

Example 8

A pitting, write-once type optical disc was obtained by forming a recording layer of TeSeF (25 nm in thickness) by reactive sputtering using selenium hexafluoride gas on a mirror face polycarbonate substrate of 1.2 mm in thickness having the in-plane birefringence of $15 \times 10^{-6}$ and the vertical birefringence of $250 \times 10^{-6}$. Recording/reading out was conducted by rotating the disc at a linear velocity of 15 m/s and focusing an argon laser beam of a wavelength of 488 nm through an objective lens having a numerical aperture of 0.60. When recording was conducted at a track pitch of 0.85 μm under the conditions of a frequency of 17.5 MHz and a pulse width of 20 ns, CNR of 48 dB was obtained and the bit error rate was satisfactory as $2 \times 10^{-5}$. Further, the amplitude variation of the readout waveform was as small as not more than 10%.

Comparative Example 1

A magneto-optical disc was obtained by forming the same recording layer as in Example 1 on a polycarbonate substrate of 1.2 mm in thickness in which guide grooves having a groove width of 0.4 μm and a groove depth of 60 nm were formed at a track pitch of 0.85 μm. When recording was conducted by rotating the disc at a linear velocity of 15 m/s and focusing an argon laser beam of a wavelength of 488 nm through an objective lens having a numerical aperture of 0.60 under the conditions of a frequency of 17.5 MHz and a pulse width of 20 ns, CNR of only 40 dB was obtained and the bit error rate was poor as $6 \times 10^{-4}$. Further, the amplitude variation of the readout waveform was as small as not more than 10%. The used glass substrate had the in-plane birefringence of $15 \times 10^{-6}$ and the vertical birefringence of $250 \times 10^{-6}$.

Comparative Example 2.

When recording was conducted by rotating the same magneto-optical disc as in Example 1 at a linear velocity of 15 m/s and focusing an argon laser beam of a wavelength of 488 nm through an objective lens having a numerical aperture of 0.80 under the conditions of a frequency of 17.5 MHz and a pulse width of 20 ns, at a track pitch of 0.85 μm, CNR of 47 dB was obtained, but the bit error rate was poor as $9 \times 10^{-4}$. Further, the amplitude variation of the readout waveform was great as 20% because focus servo could not completely follow.

Comparative Example 3

When recording was conducted by rotating the same magneto-optical disc as in Example 1 at a linear velocity of 15 m/s and focusing an argon laser beam of a wavelength of 488 nm through an objective lens having a numerical aperture of 0.45 under the conditions of a frequency of 17.5 MHz and a pulse width of 20 ns, for a track pitch of 0.85 μm, CNR only at 40 dB was obtained, and the bit error rate was extremely poor as $3 \times 10^{-3}$. Further, the amplitude of the readout waveform was not more than one-half as compared with Example 1 and the amplitude variation was as large as 20%.

Comparative Example 4

When recording was conducted by rotating the same magneto-optical disc as in Example 1 at a linear velocity of 15 m/s and focusing an argon laser beam of a wavelength of 407 nm through an objective lens having a numerical aperture of 0.70 under the conditions of a frequency of 17.5 MHz and a pulse width of 20 ns, at a track pitch of 0.35 μm, CNR of only 40 dB was obtained, and the bit error rate was extremely poor as $5 \times 10^{-3}$. Further, the amplitude variation of the readout waveform was as great as 20% because of signal leakage from adjacent tracks (crosstalk).

Comparative Example 5

A magneto-optical disc was obtained by forming a recording layer of the same constitution as in Example 1 by using a mirror face polycarbonate substrate of 1.2 mm in thickness having the in-plane birefringence of $20 \times 10^{-6}$ and the vertical birefringence of $500 \times 10^{-6}$. When recording was conducted by rotating the disc at a linear velocity of 15 m/s and focusing an argon laser beam of a wavelength of 488 nm through an objective lens having a numerical aperture of 0.60 under the conditions of a frequency of 17.5 MHz and a pulse width of 20 ns, at a track pitch of 0.85 μm, CNR of only 40 dB was obtained and the bit error rate was poor as $6\times10^{-4}$. Further, the amplitude variation of the readout waveform was as small as not more than 10%.

Data obtained in the foregoing examples and comparative examples are collectively shown in Table 1.

Practically usable levels of CNR and bit error rate are not more than about $1\times10^{-4}$ and not less than about 45 dB, respectively.

The overall evaluation was made as below based on CNR and bit error rate in consideration of recording density.

O excellent

X poor

TABLE 1

| | Wavelength of laser (nm) | NA of objective lens | Substrate material | Track pitch (μm) | Guide groove | Recording layer material | CNR (dB) | Bit error rate | Overall evaluation |
|---|---|---|---|---|---|---|---|---|---|
| Example 1 | 488 | 0.60 | PMMA | 0.85 | No | TbFeCo | 47 | $1 \times 10^{-5}$ | O |
| Example 2 | 488 | 0.60 | Glass | 0.85 | No | TbFeCo | 48 | $1 \times 10^{-5}$ | O |
| Example 3 | 407 | 0.70 | PMMA | 0.50 | No | TbFeCo | 47 | $2 \times 10^{-5}$ | O |
| Example 4 | 488 | 0.60 | PMMA | 0.85 | No | TbFeCo | 48.5 | $1 \times 10^{-5}$ | O |
| Example 5 | 488 | 0.60 | Poly-carbonate | 0.85 | No | TbFeCo | 45 | $3 \times 10^{-5}$ | O |
| Example 6 | 488 | 0.60 | Poly-carbonate | 0.85 | No | TbFeCo | 47 | $1 \times 10^{-5}$ | O |
| Example 7 | 488 | 0.60 | Poly-carbonate | 0.85 | No | GeSbTe | 51 | $1 \times 10^{-5}$ | O |
| Example 8 | 488 | 0.60 | Poly-carbonate | 0.85 | No | TeSeF | 48 | $2 \times 10^{-5}$ | O |
| Comp. example 1 | 488 | 0.60 | Poly-carbonate | 0.85 | Yes | TbFeCo | 40 | $6 \times 10^{-4}$ | X |
| Comp. example 2 | 488 | 0.80 | PMMA | 0.85 | No | TbFeCo | 47 | $9 \times 10^{-4}$ | X |
| Comp. example 3 | 488 | 0.45 | PMMA | 0.85 | No | TbFeCo | 40 | $3 \times 10^{-3}$ | X |
| Comp. example 4 | 407 | 0.70 | PMMA | 0.35 | No | TbFeCo | 40 | $5 \times 10^{-3}$ | X |
| Comp. example 5 | 488 | 0.60 | Poly-carbonate | 0.85 | No | TbFeCo | 40 | $6 \times 10^{-4}$ | X |

What is claimed is:

1. An optical recording method of conducting recording/reading out for information by irradiating a laser beam at a wavelength of not more than 500 nm onto a recording layer of an optical disc comprising a disc substrate and a recording layer, and having a track pitch of not less than 0.4 μm and less than 0.9 μm, a recording area for information recording on the disc substrate being a flat area not having a guide groove for each track, and the disc substrate having an in-plane birefringence of not more than $20\times10^{-6}$ and a vertical birefringence of not more than $300\times10^{-6}$.

the laser beam being incident from a disc substrate side of the optical disc using an objective lens having numerical aperture of 0.55 to 0.70.

2. An optical recording method according to claim 1, wherein the disc substrate is a plastic substrate.

3. An optical recording method according to claim 1, wherein the disc substrate has pits for tracking.

4. An optical recording method according to claim 3, wherein the tracking is conducted by a sampled servo system.

5. An optical recording method according to claim 1, wherein a non-reflective coating layer is disposed on a laser-incident surface of the disc substrate.

6. An optical recording method according to claim 1, wherein the recording layer is a magneto-optical recording layer.

7. An optical recording method according to claim 1, wherein the recording layer is a phase change recording layer.

8. An optical recording method according to claim 1, wherein the recording layer is an ablative recording layer.

9. An optical recording medium suitable for recording/reading out information by irradiating a laser beam at a wavelength of not more than 500 nm onto a recording layer of the optical recording medium, the laser beam being incident from a disc substrate side of the optical recording medium through an objective lens having numerical aperture of 0.55 to 0.70, said optical recording medium comprising a disc substrate and a recording layer, and having a track pitch of not less than 0.4 μm and less than 0.9 μm, a recording area for information recording on the disc substrate being a flat area not having a guide groove for each track, and the disc substrate having an in-plane birefringence of not more than $20\times10^{-6}$ and a vertical birefringence of not more than $300\times10^{-6}$.

10. An optical recording medium according to claim 9, wherein the disc substrate is a plastic substrate.

11. An optical recording medium according to claim 9, wherein the disc substrate has pits for tracking.

12. An optical recording medium according to claim 9, wherein a non-reflective coating layer is disposed on a laser-incident surface of the disc substrate.

13. An optical recording medium according to claim 9, wherein the recording layer is a magneto-optical recording layer.

14. An optical recording medium according to claim 9, wherein the recording layer is a phase change recording layer.

15. An optical recording medium according to claim 9, wherein the recording layer is an ablative recording layer.

* * * * *